(12) United States Patent
Van Rompay

(10) Patent No.: US 11,499,520 B2
(45) Date of Patent: Nov. 15, 2022

(54) DEVICE FOR GENERATING HYDROELECTRIC ENERGY

(71) Applicant: Boudewijn Gabriël Van Rompay, Clearwater, FL (US)

(72) Inventor: Boudewijn Gabriël Van Rompay, Clearwater, FL (US)

( * ) Notice: Subject to any disclaimer, the term of this patent is extended or adjusted under 35 U.S.C. 154(b) by 0 days.

(21) Appl. No.: 17/432,230

(22) PCT Filed: Feb. 20, 2020

(86) PCT No.: PCT/IB2020/051435
§ 371 (c)(1),
(2) Date: Aug. 19, 2021

(87) PCT Pub. No.: WO2020/170194
PCT Pub. Date: Aug. 27, 2020

(65) Prior Publication Data
US 2022/0186702 A1    Jun. 16, 2022

(30) Foreign Application Priority Data
Feb. 20, 2019   (BE) .................................... 2019/5110

(51) Int. Cl.
*F03B 13/22*    (2006.01)
(52) U.S. Cl.
CPC ........ *F03B 13/22* (2013.01); *F05B 2220/706* (2013.01); *F05B 2240/93* (2013.01); *F05B 2240/95* (2013.01)
(58) Field of Classification Search
CPC .......................... F03B 13/22; F05B 2220/706; F05B 2240/93; F05B 2240/95
See application file for complete search history.

(56) References Cited

U.S. PATENT DOCUMENTS

| 4,207,739 A * | 6/1980 | Scarpi ..................... F03B 13/20 60/497 |
| 2013/0119668 A1 | 5/2013 | Chang-Hui |
| 2015/0167649 A1 | 6/2015 | Barsacq et al. |

FOREIGN PATENT DOCUMENTS

GB    2476860 A    7/2011

OTHER PUBLICATIONS

International Search Report & Written Opinion to corresponding PCT Application No. PCT/IB2020/051435 dated Jun. 23, 2020.

* cited by examiner

*Primary Examiner* — Viet P Nguyen
(74) *Attorney, Agent, or Firm* — Dinsmore & Shohl LLP

(57) ABSTRACT

A device for generating hydroelectric energy, using the swell of a mass of water, said device containing an impeller which is rotatable around a shaft and at least one electric generator group, the drive shaft of which is coupled at least in one direction of rotation in a torque transmitting manner to the impeller shaft, whereby the device is provided with a floating casing which contains two compartments which are partly filled with fluid and which via a passage are fluidly connected with each other, whereby the device furthermore contains an air-filled caisson, which has an open bottom and opens out to said passage and whereby in said caisson the impeller is rotatably mounted around a shaft which extends perpendicular to the direction of the passage and whereby the impeller is partly mounted in the air-filled space of the caisson and partly in the fluid in the passage.

17 Claims, 4 Drawing Sheets

DEVICE FOR GENERATING HYDROELECTRIC ENERGY

CROSS-REFERENCE TO RELATED APPLICATIONS

The present application is the National Phase entry of International Patent Application No. PCT/IB2020/051435 filed Feb. 20, 2020, the entire contents of which are hereby incorporated by reference into this application.

TECHNICAL FIELD

The present disclosure relates to a device for generating hydroelectric energy.

BACKGROUND

In particular the present disclosure is intended for generating renewable hydroelectric energy, using waves or swell.

Known systems have a serious problem with working parts that are below water level. Such working parts are very sensitive to corrosion and also to maritime fouling such as algae and barnacles which severely impair the efficiency of the systems and also require a lot and difficult maintenance of sometimes complex forms of moving parts.

A kind of underwater turbine is already known, whereby a screw, rotor or the like are placed under water which will start to rotate by the flow of the water and can thus generate an electric current.

Such known installations show the disadvantage that turbines and the generators connected thereto need to be meticulously sealed to prevent the adverse effects of exposure to the water.

This not only makes the installation expensive, but also difficult to maintain.

Moreover, the rotating blades of the screw, rotor or the like form a danger to marine life.

The purpose of the present disclosure is to provide a solution to at least one of the aforementioned and other disadvantages.

SUMMARY

To this end, the present disclosure relates to a device for generating hydroelectric energy, using waves or the swell of a mass of water, said device containing an impeller which is rotatable around a shaft and at least one electric generator group, the drive shaft of which is coupled at least in one direction of rotation in a torque transmitting manner to the impeller shaft, whereby the device is provided with a floating casing which contains two compartments which are partly filled with fluid and which via a passage are fluidly connected with each other, whereby the device furthermore contains an air-filled caisson, which has an open bottom and opens out to said passage and whereby in said caisson the impeller is rotatably mounted around a shaft which extends perpendicular to the direction of the passage and whereby the impeller is partly mounted in the air-filled space of the caisson and partly in the fluid in the passage.

A condition is that the device must be able to move freely in the swelling of the water.

Thus, the device is configured to convert the energy of the swelling of the water to a motion of the impeller. The device is formed by communicating vessels, formed by the two compartments which are connected at the bottom by a fluid passage.

The motion of the waves throws the device back and forth, such that the fluid flows through the passage from the one compartment to the other and back, such that the impeller starts rotating.

In some embodiments, the air or the gas in the caisson is kept under pressure by a compressor or the like, such that the level of the fluid in the caisson may be kept constant and under the level of the impeller shaft, such that the shaft can rotate in the dry part and only the lower section of the impeller is driven by the flow of the fluid in the passage on the outer contour of the impeller where the generated torque is greatest, while the upper section can rotate in the air or in the gas in the caisson in a friction-free way.

In some embodiments, the floating casing is held in place at a height above the bottom of the swelling water by an anchor in the bottom, such that the device can roll freely with the wave motion and the passage between both compartments is located in the motion direction of the waves to have the greatest effect of the swell.

In some embodiments, the direction of the anchor is such that the waves realise a maximum effect on the communicating vessels in the casing. This will ensure that the device is able to obtain hydroelectric energy from the swelling of the water in the most optimal way.

This provides the advantage that the impeller is isolated from the mass of water of the sea or the like and consequently is not subjected to maritime conditions, such as algae and corrosion.

The fluid can be a neutral non-corrosive fluid such as distilled water or the like in which maritime bodies do not grow well due to the lack of nutrients and/or light.

Indeed, all working parts are inside the enclosed casing. In some embodiments, the casing is accessible via access hatches.

This has the advantage that the parts of the device are not exposed to the seawater such that their construction and more specifically their sealing will have to be less subject to strict requirements. Also, the maintenance of the device will be much easier and cheaper.

Moreover, the device is hidden from view, such that the natural view is not disturbed.

Such device can for example be made in a vessel, provided that the vessel is sufficiently sensitive to the wave motion.

In some embodiments, the device is used at sea, where there is sufficient swelling.

In some embodiments, the impeller is provided with a number of blades at least one of which continuously partially extends into the fluid of the casing during operation.

In this way the impeller can be set in motion by the water without it being necessary to place the impeller shaft under water as well.

In another embodiment the impeller shaft is not in the water.

This offers the advantage that the device is very simple which makes its construction affordable. Apart from the blades of the impeller there are no other moving parts under water, such that therefore no extra attention is necessary for seals and other prevention measures to prevent the damaging effects of the seawater.

In some embodiments, the generator and the compressor are housed in a dry section of the internal space of the casing, such that no extra high demands need to be set on these components in terms of moisture resistance.

In some embodiments, the drive shaft of at least one generator rotates with the impeller shaft in a first direction of rotation and is freely rotatable in the other second direction of rotation and the drive shaft of at least one generator which is freely rotatable in the first direction of rotation rotates in the second direction of rotation with the impeller shaft.

In some embodiments, the generator contains a freewheel which allows a free rotation in one direction and forms a non-rotatable coupling in the other direction of rotation.

The device can be provided with a transmission between the generator and the impeller shaft and contains a mechanism to reverse the direction of rotation of the shaft of the generator in relation to the impeller to ensure that the generator is always driven in the same direction of rotation, regardless of the direction of rotation of the impeller.

In some embodiments, all parts of the device which come into contact with the water are treated with a non-toxic coat of paint based on a surface-treated composite coating, genre Ecospeed®.

Such coating will ensure that any fouling of slime, algae etc. of said parts can be easily removed.

Moreover, such coating offers a very good protection against corrosion, such that the metal components can be made thinner because possible damage by corrosion does not have to be taken into account.

The present disclosure also relates to a series of devices whereby they are placed in the waves at a distance from each other seen in the direction of the waves and spread over such a distance that at least one device is always in a zone with swelling.

BRIEF DESCRIPTION OF THE DRAWINGS

With the intention of better showing the characteristics of the present disclosure, embodiments of a device for generating hydroelectric energy according to the present disclosure are described hereinafter, by way of an example without any limiting nature, with reference to the accompanying drawings, wherein.

DETAILED DESCRIPTION

Figure 1:
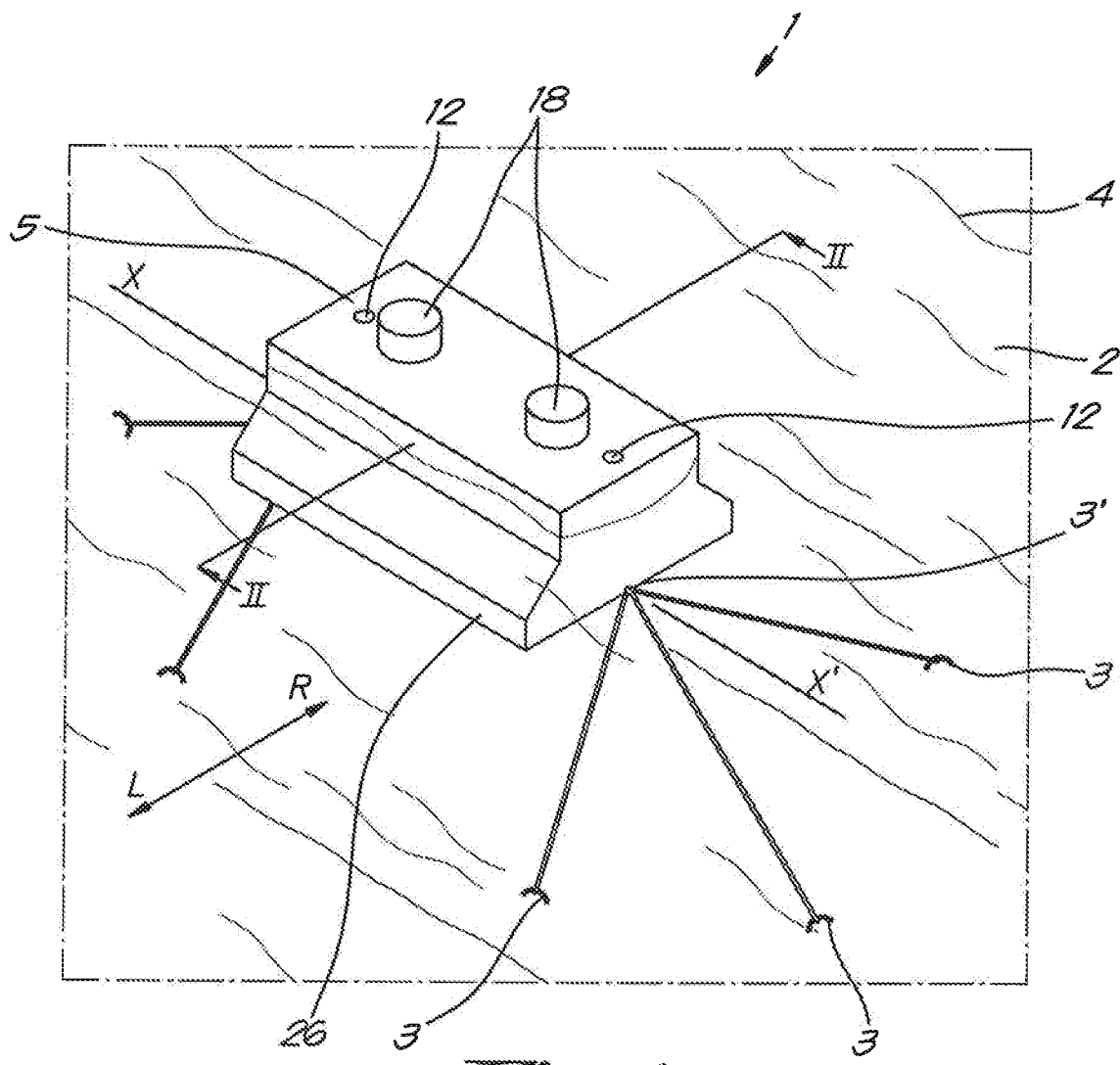
FIG. 1 schematically shows a device according to the present disclosure for generating hydroelectric energy whereby the device is mounted in a swelling medium.

FIG. 1 shows a device 1 according to the present disclosure which has been floatingly placed on a mass of water 2 with swelling, for example on a sea. The device 1 floats on the water and is anchored to the bottom of the mass of water by an anchor 3 to stay in place and to not float away.

The anchor 3 is such that the device 1 can still roll freely around a rolling axis X-X' which is perpendicular to the motion direction LR of the waves 4.

The device 1 consists of a floating closed casing 5 with two separate compartments 6 and 7 therein on either side of the rolling axis X-X' located between said compartments 6 and 7.

The compartments 6 and 7 are partly filled up to a certain level 8, respectively 9, with a fluid 10 and are connected to each other as communicating vessels via a passage.

The fluid is distilled water, for example.

The compartments 6 and 7 are provided with ventilation holes 12.

In the casing 5 between the compartments 6 and 7, a caisson 13 is provided in the form of a clock with an open bottom 14 which opens to said passage 11.

Figure 2A:
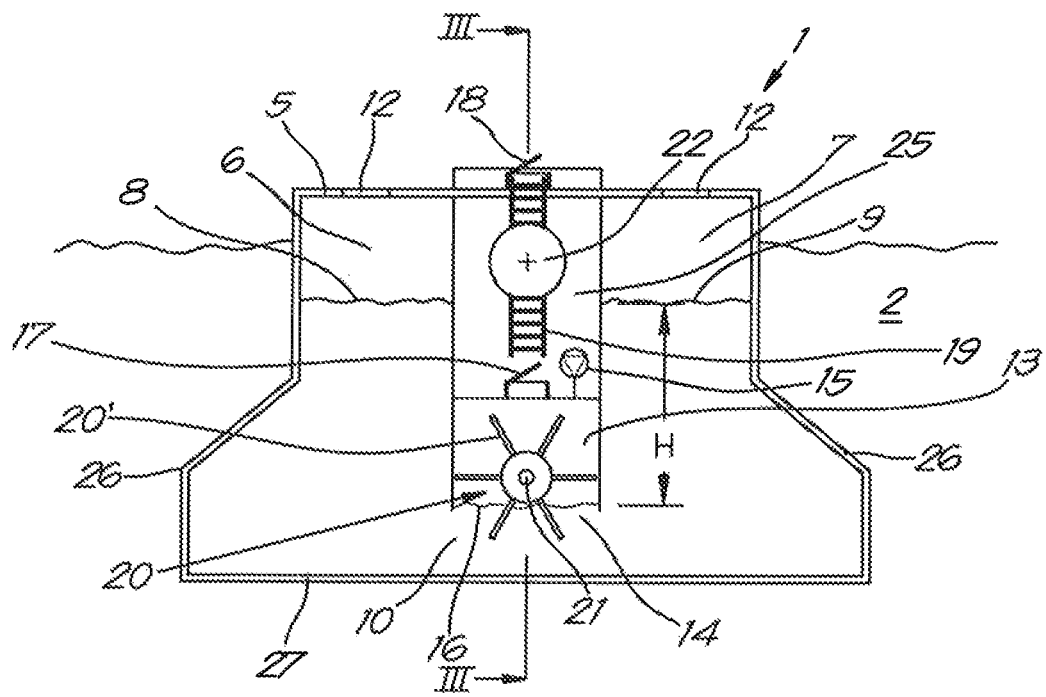
FIG. 2A shows a cross-section according to line II-II of FIG. 1.
Figure 2B:
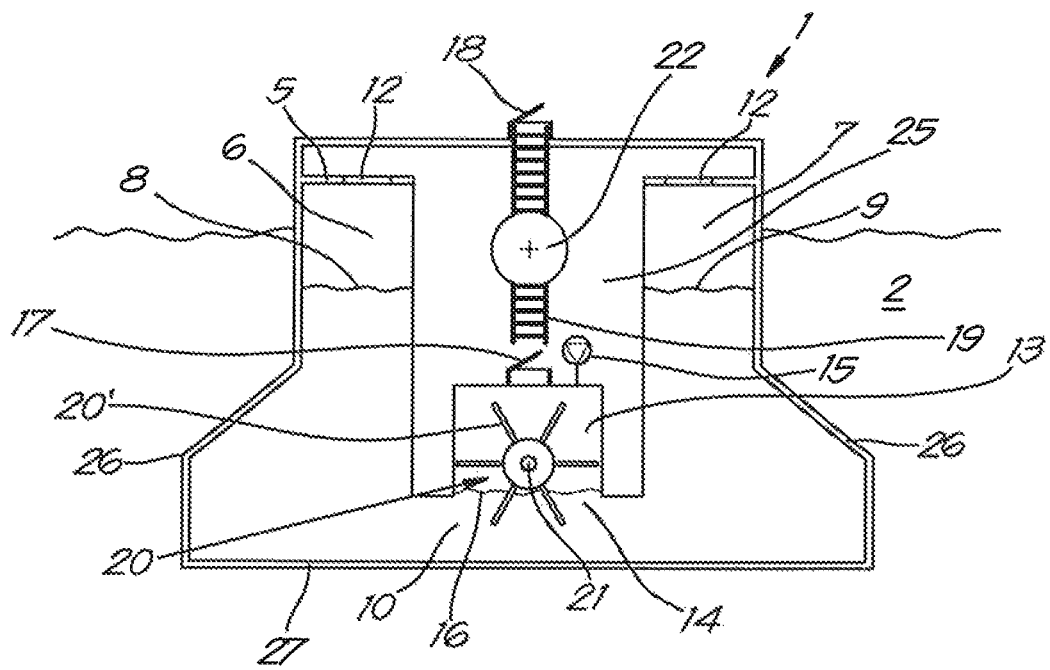
FIG. 2B shows a cross-section as that of FIG. 2A, but for an alternative embodiment according to the present disclosure.

The caisson 13 is filled with air or with another gas which by a compressor 15 or another device is kept under pressure, such that the level 16 of the fluid 10 in the caisson 13 is kept as low as possible under the levels 8 and 9 and constant. To this end a pressure is necessary equal to the pressure of a fluid column with height H which, in the position of FIG. 2A, is equal to the difference in level between the level 9 of the fluid 10 in the compartments and the desired level 16 in the caisson 13.

The caisson 13 is hermetically sealed at the top, but is provided with an access hatch 17 to provide access to maintenance staff which can descend into the casing 5 via a ladder 19 via a second access hatch 18.

A water turbine in the form of an impeller 20 is located in the caisson 13 which is rotatably mounted around a shaft 21 which extends perpendicular to the direction of the passage 11, whereby the impeller 20 is mounted partly in the air-filled space of the caisson 13 and with its lower blades 20' in the fluid in the passage 11.

In this case, the blades 20' are radial blades which extend parallel with the shaft 21.

In some embodiments, the shaft 21 is located at a certain height above the level. The impeller 20 is designed in such a way that it partly extends in the fluid in the passage 11 and partly in the air in the caisson 13, whereby at least one of the blades 20' continuously extends at least partially in the water.

Figure 3:
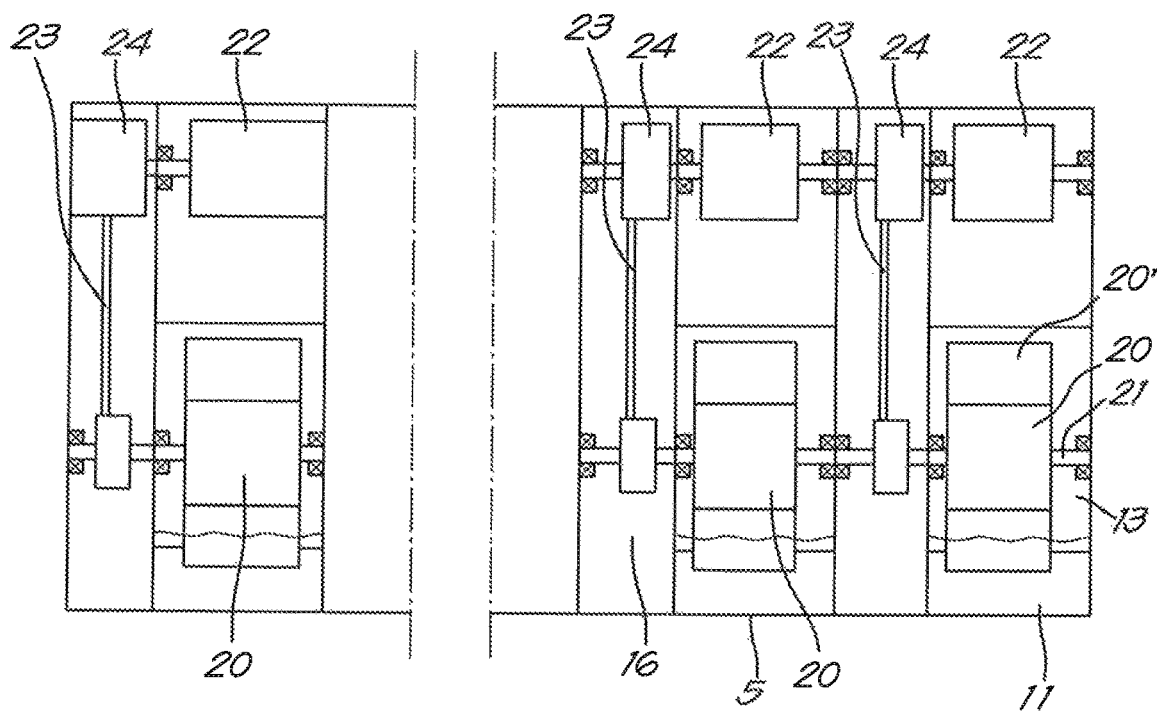
FIG. 3 shows a cross-section according to the line III-III in FIG. 2A.

The device can also contain more than one impeller 20 as in the example of FIG. 3 in which several impellers 20 are set up next to and/or behind each other.

In the arrangement of FIG. 3 there is a separate passage 11 for every impeller 20 to channel the fluid between the compartments 6 and 7. The shafts 21 of the different impellers 20 are in each other's extension, although that is not necessary.

The device 1 is further provided with one or more generators 22 which can be driven by the one or more impellers 20 via a chain drive 23 or another drive which may contain a transmission 24 which may be designed such that for example the drive shaft drives the generators 22 faster than the respective impellers 20.

In some embodiments, the generators 22 and the transmissions, as well as the compressor 15 are located in a dry section 25 of the internal space of the casing 5.

In some embodiments, the casing 5 has the form of a bar with a wider part at the bottom in the form of wings 26, as shown in the figures. Said form is advantageous for the stability and for absorbing the wave motion of the mass of water 2 and converting it in a motion of the fluid 10 in the casing 5 as will be explained hereafter based on the FIGS. 4 and 5 between the communicating vessels or compartments 6 and 7.

Figure 4:
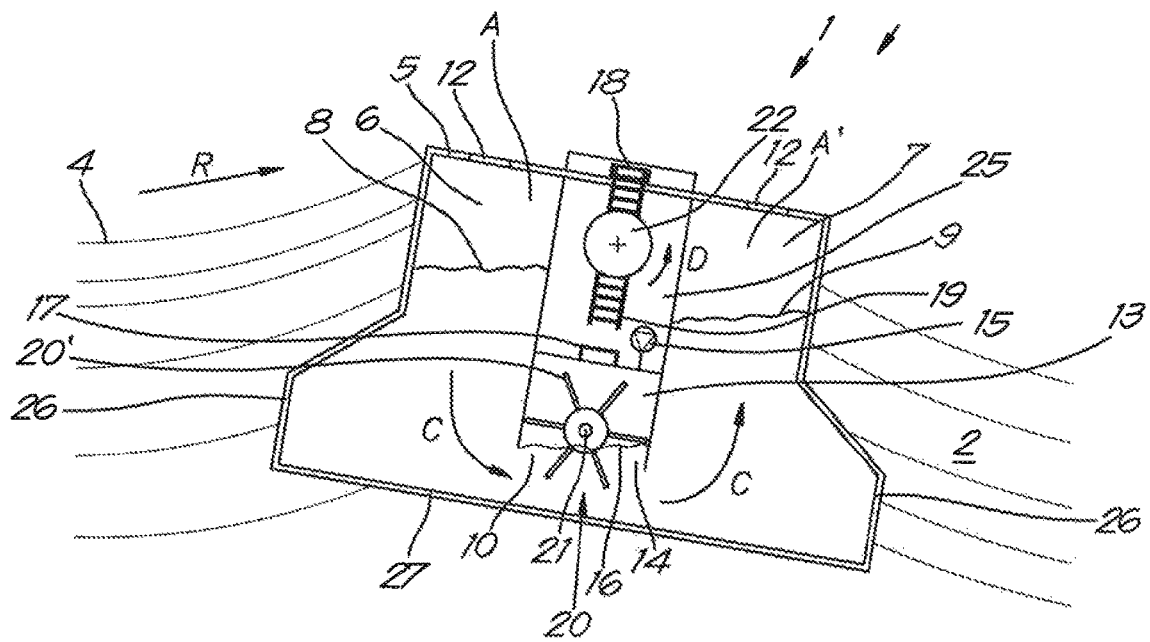
FIG. 4 shows the cross-section of FIG. 2A during operation in a swelling medium with waves coming from the left.

FIG. 4 shows a cross-section according to the line II-II in FIG. 1 whereby the device 1 is mounted in a swelling medium 2 with waves 4 which move to the right in the figure as indicated by arrow R, with a swell which is oriented perpendicular to the longitudinal direction X-X' of the casing 5.

When the device 1 is mounted in the waves 4 the swell will roll the casing 5 around its longitudinal axis X-X', such that the swell is transferred to the fluid 10 in the casing 5 and initially the water level 8 in the left compartment is higher than the water level 9 in the right compartment space 10'.

By the effect of the communicating vessels the water of the left compartment 6 flows via the passage 11 to the right compartment 7 in the direction of the arrows C in FIG. 4, such that the impeller 20 will start rotating in said direction and consequently the generator 22 is driven in the direction of rotation D to generate electricity.

The ventilation holes 12 prevent that in the left compartment 6 the air could be compressed and create a vacuum in the right compartment, which would counteract the motion of the fluid between the communicating vessels.

Figure 5:
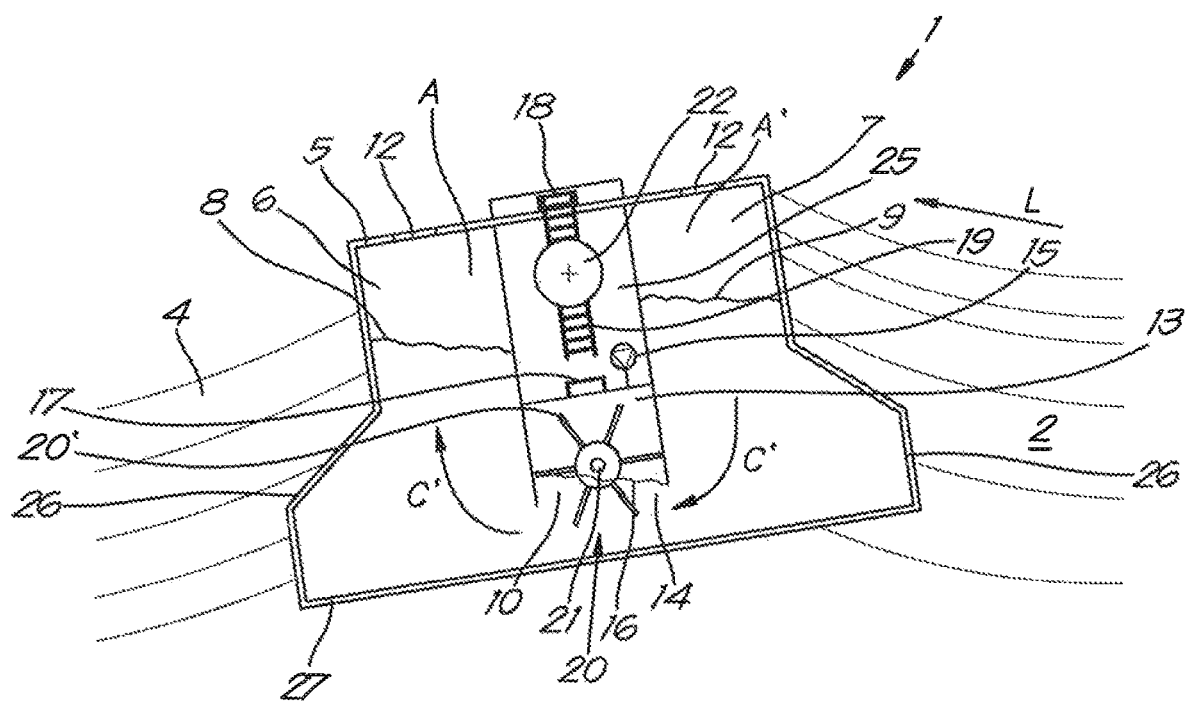
FIG. 5 shows an analogue figure as that of FIG. 4 but with waves coming from the right.

When a wave 4 has passed, the device 1 will roll in the other direction as shown in FIG. 5, such that the level 8 will now be lower than the level 9 and the water will flow back in the direction of the arrows C' in FIG. 5, such that the impeller 20 will be driven in the other direction.

In some embodiments, a freewheel is provided in the transmission 24 which when the fluids flow back in the direction C' can rotate the impeller 20 freely without the generator 22 being driven, all this to ensure that the impeller 20 in said situation does not form an obstacle for the fluid flowback and the generator 22 is driven in only one single direction D, be it with intervals of the succession of the waves.

The succession of the waves means that during certain periods the impeller 20 is driven in one direction of rotation around its shaft 21 and in other periods in the reverse direction of rotation and the generator group will only generate electricity in one out of the two periods.

To still be able to generate electricity continuously, the device 1 can be conceived such that when the freewheel of one impeller 20 works in one direction, the freewheel of another impeller 20 works in the other direction, such that one generator 22 of both impellers 20 supplies electricity during one period, while in the following period in which said generator 22 does not supply electricity it is the other generator 22 which does supply electricity in this period. Thus, current peaks are smoothed out.

The use of batteries to store the electricity can also help to smooth out the current even further.

Another way, instead of using freewheels, is to switch the transmission 24 such that the input shaft of the transmission 24 is driven in any direction, while the output shaft is always driven in the same direction D.

In some embodiments, the width of the blades 20' is slightly less than the width of the passage 11 such that there is only little lateral play between the blades 20' and the passage 11 and the blades 20' consequently get to process the whole flow through the passage 11. Analogously, there is little play between the outer contour of the impeller 20 and the bottom 27 of the passage to allow as little fluid flow to leak away unutilised next to and under the impeller 20 and the hydraulic flow pressure of the water is thus utilised to a maximum extent to drive the impeller 20.

The generated energy of one or several devices 1 can for example be transmitted via a cable to an inverter on the quay. This can be realised by fittingly connecting one or several generator groups with each other.

The present disclosure is not limited to the embodiments described as an example and shown in the drawings, but a device and method according to the present disclosure as defined by the claims can be realised in all kinds of variants without departing from the scope of the present disclosure.

The invention claimed is:

1. A device for generating hydroelectric energy, using waves or a swell of a mass of water, said device comprising:
    an impeller which is rotatable around a shaft;
    at least one electric generator, a drive shaft of the at least one electric generator is coupled at least in one direction of rotation in a torque transmitting manner to the shaft of the impeller;
    a floating casing which contains two compartments which are partly filled with fluid, the two compartments and which via a passage are fluidly connected with each other via a passage; and
    an air- or gas-filled caisson, which has an open bottom and opens out to the passage, whereby in the caisson the impeller is rotatably mounted around the shaft which extends perpendicular to a passage direction of the passage and whereby the impeller is partly mounted in an air- or gas-filled space of the caisson and partly in the fluid in the passage, and the caisson is under pressure due to a compressor.

2. The device according to claim 1, wherein a level of the fluid in the passage is kept constant.

3. The device according to claim 1, wherein the two compartments are provided with a ventilation hole.

4. The device according to claim 3, wherein the casing is hermetically sealed except for the ventilation hole for the two compartments.

5. The device according to claim 1, wherein the device is anchored to stop it floating away in such a way that the device can still freely roll in the swell around a rolling axis perpendicular to a motion direction of the waves.

6. The device according to claim 5, wherein the rolling axis is located between the two compartments.

7. The device according to claim 1, wherein the shaft of the impeller is located above a level of the open bottom of the caisson.

8. The device according to claim 1, wherein the shaft of the impeller is located above a level of the fluid in the caisson.

9. The device according to claim 1, wherein the impeller is provided with a number of blades at least one of which continuously partially extends in the fluid in the passage during operation.

10. The device according to claim 9, wherein the blades of the impeller are perpendicular to the passage direction of the passage.

11. The device according to claim 10, wherein the blades are flat blades which are radially mounted on the shaft of the impeller.

12. The device according to claim 9, wherein the blades are flat blades which are radially mounted on the shaft of the impeller.

13. The device according to claim 1, wherein the casing, seen in cross-section perpendicular to the shaft of the impeller, is wider at a bottom than at a top.

14. The device according to claim 1, wherein the generator is located in a dry section in an internal space of the casing.

15. The device according to claim 1, wherein several impellers are provided in one casing, whereby the impellers are parallel to each other with the shafts and relative to a direction of the waves are placed behind or next to each other.

16. The device according to claim 1, wherein the drive shaft of the at least one generator rotates with the shaft of the impeller in a first direction of rotation and is freely rotatable in the other second direction of rotation and that the drive shaft of the at least one generator which is freely rotatable in the first direction of rotation rotates with the shaft of the impeller in the second direction of rotation.

17. The device according to claim 1, wherein the at least one generator contains a freewheel which allows a free rotation in one direction and forms a non-rotatable coupling in the other direction of rotation.

* * * * *